Oct. 7, 1924.
L. G. CARON ET AL
1,510,492
NUT
Filed March 25, 1922
2 Sheets-Sheet 1
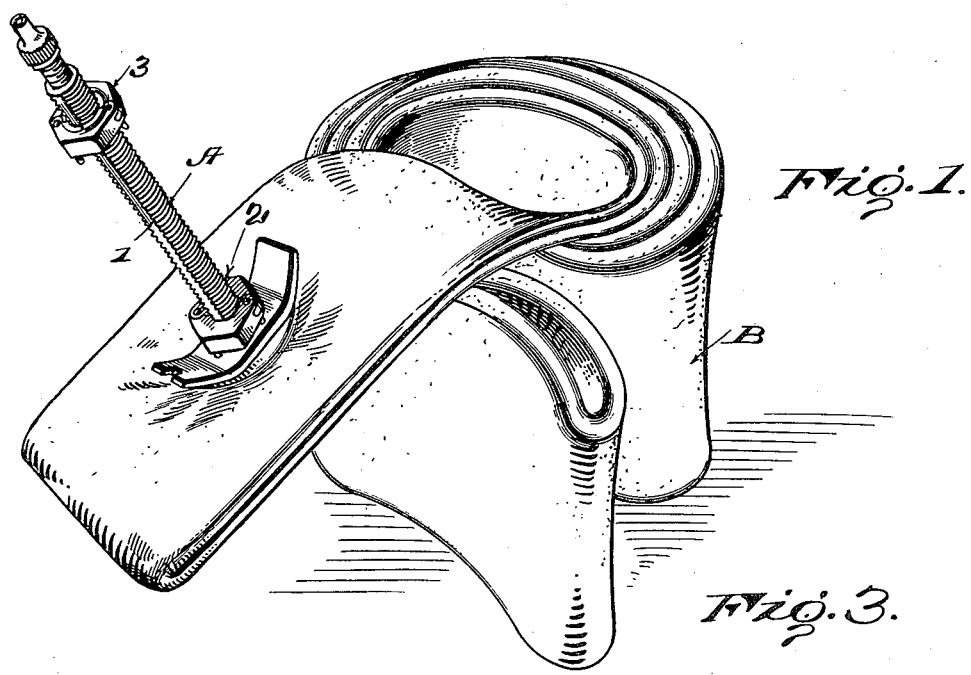
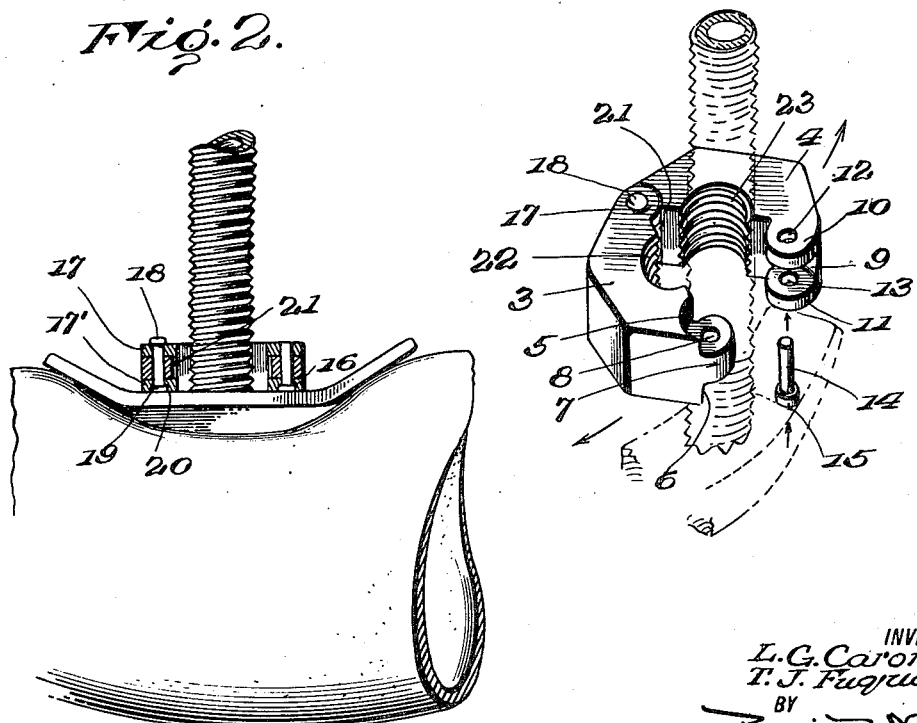
INVENTORS
L. G. Caron
T. J. Fugua
BY
Benj. R. Newcomb
ATTORNEYS Oct. 7, 1924.  1,510,492
L. G. CARON ET AL
NUT
Filed March 25, 1922  2 Sheets-Sheet 2
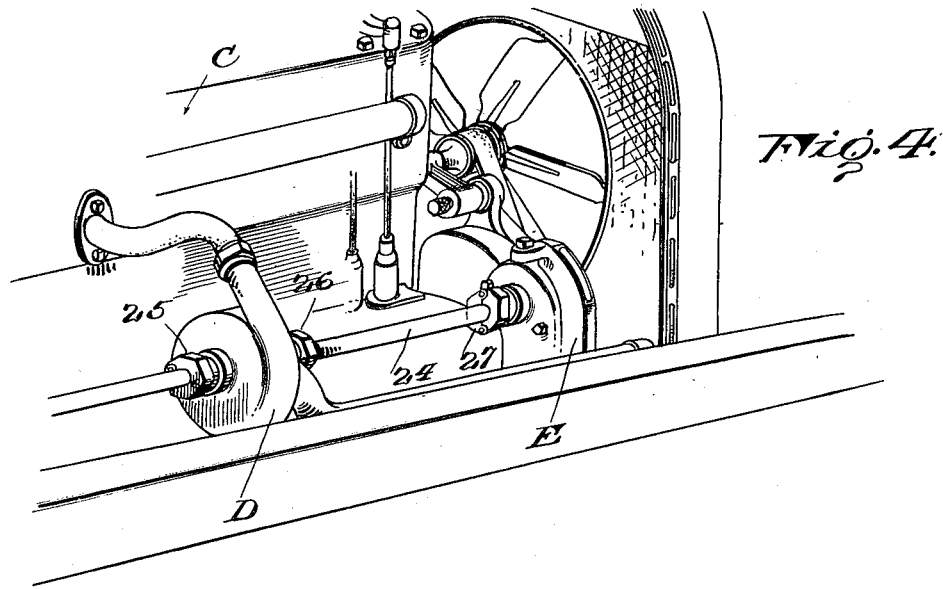
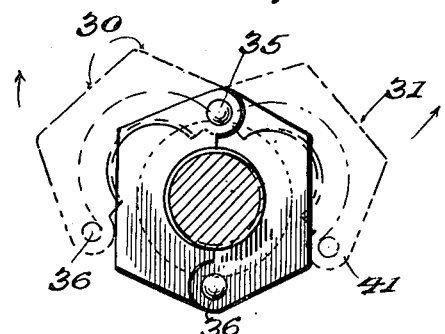
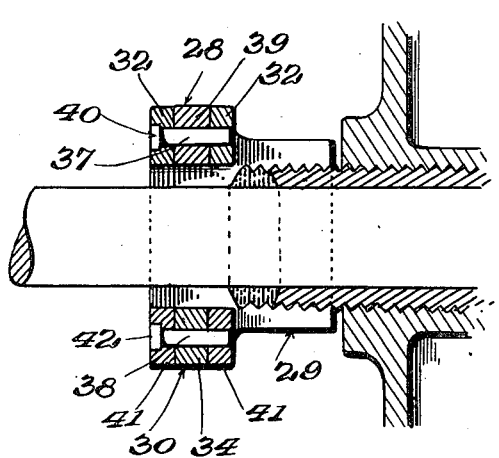
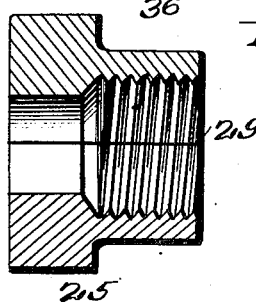
INVENTORS
L. G. Caron and
T. J. Fuqua
BY
Ray R. Newcomb
ATTORNEY Patented Oct. 7, 1924.

1,510,492

UNITED STATES PATENT OFFICE.

LOUIS G. CARON AND TUCKERMAN J. FUQUA, OF WASHINGTON, DISTRICT OF COLUMBIA.

NUT.

Application filed March 25, 1922. Serial No. 546,863.

*To all whom it may concern:*

Be it known that we, LOUIS G. CARON and TUCKERMAN J. FUQUA, citizens of the United States, residing at Washington, in the District of Columbia, have invented certain new and useful Improvements in a Nut, of which the following is a specification.

This invention relates to a nut of a type adapted to facilitate the assembling and disassembling of parts secured by the same, and which otherwise would require the complete screwing up of the usual nut in order to assemble the same, or the complete unscrewing of such a nut to disassemble the same.

Otherwise stated, the present invention contemplates a nut which is divided in a plane coincident with its axis for the purpose of permitting it to be taken apart for removal from a threaded shank, or it may be assembled to the threaded shank at approximately its set position and finally screwed down into place in the usual manner by a wrench.

Another feature of the invention resides in constructing the nut of identical interfitting sections, thus making an easy manufacturing proposition.

A still further feature consists in forming the sections with interfitting tongue and groove members of such a nature that they serve to lock the sections together when the nut is finally screwed into its set position.

A further feature consists of the manner of finally locking the sections together.

With the above, and other features in mind, we will now proceed to describe specific embodiments of the invention which we have shown only by way of illustration in the accompanying drawings.

In the drawings:

Figure 1 is a perspective view of an inner tube of a pneumatic tire having a valve equipped with the present invention.

Fig. 2 is a sectional view on the line 2—2 of Fig. 1.

Fig. 3 is a perspective view of the nut opened for either placing it in position or removing same.

Fig. 4 is a perspective view showing the stuffing box of a motor vehicle pump shaft equipped with a packing nut or gland constructed in accordance with the principle of the present invention.

Fig. 5 is a fragmentary sectional view of the same.

Fig. 6 is an end view of the packing nut; and

Fig 7 is a sectional view of the packing nut in a plane at right angles to the plane of the section of Fig. 5.

Referring to the drawings:

The invention, as shown in Figs. 1 to 3, is applied to the valve A of an inner tube B, such valve comprising, as is usual, a threaded shank 1 on to which is screwed the bushing nut 2 and the rim nut 3.

Since the nuts 2 and 3 are constructed identical it will only be necessary to describe one of the same.

Each nut is divided along its axis into two sections 3 and 4 which are of identical complemental construction, one end of the section 3 being cut away as indicated at 5 and 6 to leave a tongue 7 through which a locking pin hole 8 extends, the corresponding end of the section 4 being cut out, as indicated at 9, so as to leave two ears 10 and 11 through which holes 12 and 13 are provided for receiving a locking pin 14 having a head 15 received in the counter-sunk side 16 of the hole 13.

The remaining end of the section 3 is formed with ears 17 similar to the ears 10 and 11 of the section 4 and is drilled to receive a hinge pin 18 having a head 19 resting in the counter-sunk hole 20 of one of the ears 17. The remaining end of the section 4 carries a tongue 21 apertured to accommodate the hinge pin 18 and said tongue is identical with the tongue 7 of the section 3.

The sections 3 and 4, when assembled by the hinge pin 18, are capable of being opened in the manner indicated in Figure 3 so as to be placed sidewise on a threaded shank such as the valve stem 1. The threaded faces 22 and 23 of the opening through the assembled nut are then brought into contact with the threads of the threaded shank by closing the sections 3 and 4 together thus forming the complete nut which is then screwed down into place against the article which it is adapted to hold, and which thus causes the binding or cramping of the sections in such a manner as to lock the same against opening.

However, in order to provide positively against opening a locking pin 14 is guided into the hole 13 of the ear 11 of the section 4 and, as the nut is screwed down into place, this pin is pushed through the hole 8 in the tongue 7 permanently locking the sections 3 and 4 together until the pin 14 is removed.

It is also obvious that other means than the pin 14 may be used for locking the sections together and that the particular tongue and groove construction hereinbefore described may be varied in carrying the invention into practice.

In Figs. 4 to 6 inclusive there is indicated an internal combustion engine C, of a motor car, which is provided with the usual circulating pump D and timing gear chamber E, the pump shaft 24 extending from the timing gear chamber E to the pump, and beyond, and being provided with glands 25, 26 and 27 which are slipped onto the shaft prior to assembling and must be adjusted from time to time in order to maintain the same against leakage. Each of these glands is provided with a packing nut 28 comprising an internally threaded sleeve 29 and a hexagonal head 30. These packing nuts wear out from time to time due to strain on the threads and must be replaced; due to the fact that with the ordinary nut they must be slipped over the pump shaft 24 prior to assembling of the shaft in the motor considerable difficulty is experienced in replacing the same. However, the present packing nut 28 is split axially into two sections 30 and 31 of identical character, the section 30 having ears 32 and 33 at one end and a tongue 34 at the other and being drilled as at 35 and 36 to receive pins 37 and 38 to be hereinafter described. The section 31 carries a tongue 39 which is identical with the tongue 34 and fits between the ears 32 and is drilled to receive the pin 37, the pin 37 being inserted through the ears 32 and tongue 39 and having its head 40 resting in a countersink in one of the ears 32; the remaining end of the section 31 is provided with ears 41 identical with ears 32 and drilled to receive the locking pin 38 having a head 42 resting in a countersink in one of the ears 41.

In assembling the nut 28 to the shaft one of the pins 37 or 38 is removed and the sections opened out in the manner indicated in Fig. 6 after which the packing nut is slipped onto the shaft 24 and the sections closed together and the locking pin inserted; the nut is then screwed up to its adjusted position in the usual manner.

It is to be noted that the nut of this invention can be made of standard size and consequently is adapted to replace the usual nut. It also may be made hexagonal, square, or otherwise, and while we have herein described specific embodiments of the nut it is to be understood that in carrying the invention into practice we may resort to any and all modifications falling within the scope of the appended claims defining our invention.

We claim:

1. A nut comprising a pair of identical complementary interfitting sections, and means passing through the interfitting portions for maintaining the sections in assembled relation.

2. A nut comprising identical complementary sections forming a completed unit separable in an axial plane, and means extending through the unit parallel to the axis for maintaining the sections in assembled relation.

3. A nut comprising identical tongue and groove complementary interfitting sections forming a completed unit separable in an axial plane, and means extending through the tongue and groove portions for maintaining the sections in assembled relation.

4. A nut comprising identical tongue and groove complementary interfitting sections forming a completed unit separable in an axial plane, and pins extending through the tongue and groove portions for maintaining the sections in assembled relation.

In testimony whereof we have hereunto set our hands.

LOUIS G. CARON.
TUCKERMAN J. FUQUA.